US012753784B2

(12) United States Patent
Yamao et al.

(10) Patent No.: US 12,753,784 B2
(45) Date of Patent: Oct. 6, 2026

(54) FIXING STRUCTURE

(71) Applicant: YAZAKI CORPORATION, Tokyo (JP)

(72) Inventors: Yoshimichi Yamao, Toyota (JP); Satoshi Yokoyama, Toyota (JP); Masayoshi Ogawa, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 337 days.

(21) Appl. No.: 18/639,947

(22) Filed: Apr. 18, 2024

(65) Prior Publication Data

US 2024/0263656 A1 Aug. 8, 2024

Related U.S. Application Data

(63) Continuation of application No. PCT/JP2023/000670, filed on Jan. 12, 2023.

(30) Foreign Application Priority Data

Feb. 16, 2022 (JP) ................................ 2022-021854

(51) Int. Cl.
*F16B 2/10* (2006.01)
*F16L 3/13* (2006.01)

(52) U.S. Cl.
CPC . *F16B 2/10* (2013.01); *F16L 3/13* (2013.01)

(58) Field of Classification Search
CPC .............. F16B 2/10; F16L 3/13; F16L 3/1075
USPC .......................................................... 411/433
See application file for complete search history.

(56) References Cited

U.S. PATENT DOCUMENTS

| | | | | |
|---|---|---|---|---|
| 4,934,889 A | 6/1990 | Kurosaki | | |
| 6,070,836 A * | 6/2000 | Battie | F16L 3/223 | 248/68.1 |
| 7,322,784 B2 * | 1/2008 | Castro | F16B 37/0842 | 411/433 |
| 7,614,589 B2 * | 11/2009 | Kato | F16L 55/035 | 248/74.1 |

(Continued)

FOREIGN PATENT DOCUMENTS

| | | | |
|---|---|---|---|
| JP | H2-38708 A | 2/1990 | |
| JP | H09-32833 A | 2/1997 | |

(Continued)

OTHER PUBLICATIONS

International Search Report for PCT/JP2023/000670 dated Feb. 21, 2023.

*Primary Examiner* — Jason D Shanske
(74) *Attorney, Agent, or Firm* — KENEALY VAIDYA LLP

(57) ABSTRACT

A fixing structure includes: a main body through which a stud bolt is inserted from one side toward the other side in an axial direction; a pair of first locking pieces locked to a bolt groove of the stud bolt inserted through the main body; a pair of second locking pieces locked to the bolt groove of the stud bolt inserted through the main body; and a pair of deflection amount regulators contactable with the first locking pieces. The first locking pieces each includes an elastically deformable blade and a claw locked to the bolt groove, and the deflection amount regulators each comes into contact with the blade to regulate the deflection amount of the blade.

2 Claims, 5 Drawing Sheets

(56) References Cited

U.S. PATENT DOCUMENTS

| | | | | |
|---|---|---|---|---|
| 8,328,488 | B2 * | 12/2012 | Luk | F16B 37/0857 248/68.1 |
| 8,684,321 | B2 * | 4/2014 | Shirakabe | F16L 3/2235 24/297 |
| 8,899,894 | B2 * | 12/2014 | Limpert | F16B 37/043 411/433 |
| 9,284,974 | B2 * | 3/2016 | Iwahara | F16B 37/0857 |
| 9,334,894 | B2 * | 5/2016 | Gensler | F16B 21/073 |
| 11,486,422 | B2 * | 11/2022 | Bell | F16B 21/073 |
| 2004/0065785 | A1 * | 4/2004 | Miura | F16L 3/223 248/62 |
| 2006/0099049 | A1 * | 5/2006 | Peterson | F16B 39/32 411/433 |
| 2007/0248436 | A1 * | 10/2007 | Sano | B62D 29/048 296/204 |
| 2014/0321936 | A1 | 10/2014 | Iwahara et al. | |
| 2017/0284437 | A1 * | 10/2017 | Landsberg | F16B 5/0642 |
| 2025/0003527 | A1 * | 1/2025 | Edwards | F16L 55/035 |

FOREIGN PATENT DOCUMENTS

| | | | |
|---|---|---|---|
| JP | H11-173320 | A | 6/1999 |
| JP | 2009-185902 | A | 8/2009 |
| JP | 2014-214816 | A | 11/2014 |

* cited by examiner

FIXING STRUCTURE

CROSS-REFERENCE TO RELATED APPLICATION

This application is a continuation application of International Application No. PCT/JP2023/000670 filed on Jan. 12, 2023 which claims the benefit of priority from Japanese Patent Application No. 2022-021854 filed on Feb. 16, 2022 and designating the U.S., the entire contents of which are incorporated herein by reference.

BACKGROUND OF THE INVENTION

1. Field of the Invention

The present invention relates to a fixing structure.

2. Description of the Related Art

As a technique for mounting a mounting member such as a wire harness, a pipe, or a heat insulating member to a mounted member such as a vehicle body of an automobile, for example, Japanese Patent Application Laid-open No. H11-173320 A discloses a locking tool including: a base including a stud receiving hole for receiving a stud formed with a screw or a peripheral groove, and a stud locking part for locking itself to the screw or the like of the stud. The locking tool includes a protrusion that restricts movement of the stud locking part toward a stud root side when force to tear off the mounting member and the mounted member is applied.

As a holder that holds a stud by being locked to a screw or a peripheral groove of the stud, Japanese Patent Application Laid-open No. 2009-185902 A discloses a holder including a pair of side walls forming a stud receiving space for receiving the stud and a stud locking piece that is constituted by a deflection piece having a specific shape.

As a fixture for fixing a stud bolt by engaging therewith, Japanese Patent Application Laid-open No. H09-32833 A discloses a fixture including a locking piece that engages with the stud bolt and a spring piece that biases the locking piece so as to engage a claw of the locking piece with the stud bolt.

In the locking tool as described above, when the locking tool is attached to the stud bolt, for example, the stud bolt may obliquely enter, and normal locking may not be performed.

SUMMARY OF THE INVENTION

The present invention has been made in view of the above circumstances, and an object of the present invention is to provide a fixing structure that can appropriately mount a mounting member on a mounted member upon mounting the mounting member on the mounted member including the stud bolt by preventing oblique entry of the stud bolt.

In order to achieve the above mentioned object, a fixing structure according to one aspect of the present invention includes a main body that is provided in a mounting member and through which a stud bolt fixed to a mounted member is inserted from one side to the other side in an axial direction; a pair of first locking pieces being provided to face each other at the main body in a width direction intersecting the axial direction, the pair of first locking pieces being locked to a bolt groove of the stud bolt inserted through the main body; a pair of second locking pieces being provided to face each other at the main body in the width direction, the pair of second locking pieces being located on the other side in the axial direction with respect to the pair of first locking pieces, and the pair of second locking pieces being locked to the bolt groove of the stud bolt inserted through the main body; and a pair of deflection amount regulators being provided to face each other at the main body in the width direction, the pair of deflection amount regulators being contactable with the pair of first locking pieces, respectively, wherein the main body includes: a pair of end face walls being located to face each other in the axial direction, each of the pair of end face walls including a bolt insertion hole through which the stud bolt is to be inserted; a pair of side face walls being located to face each other in the width direction, each of the pair of side face walls extending between the pair of end face walls in the axial direction; and a bolt receiving space being formed by being surrounded by the pair of end face walls and the pair of side face walls, the bolt receiving space being configured to receive the stud bolt inserted through the bolt insertion hole, each of the pair of first locking pieces includes: a blade being formed by protruding from a corresponding one of the pair of side face walls toward the bolt receiving space and extending toward the other side in the axial direction, the blade being elastically deformable; and a claw being formed by protruding from the blade, the claw being locked to the bolt groove, each of the pair of second locking pieces include: a blade being formed by protruding from a corresponding one of the pair of side face walls toward the bolt receiving space and extending toward the other side in the axial direction, the blade being elastically deformable; and a claw being formed by protruding from the blade and being locked to the bolt groove, the blade of each of the pair of second locking pieces is fixed such that an end of the blade on the other side in the axial direction is adjacent to the bolt insertion hole of an end face wall located on the other side in the axial direction among the pair of end face walls, and each of the pair of deflection amount regulators is formed by protruding from a corresponding one of the pair of side face walls toward the bolt receiving space, and each of the pair of deflection amount regulators comes into contact with the blade to regulate a deflection amount of the blade.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that this invention is not limited to the embodiment. Constituent elements in the following embodiment include those that can be easily replaced by a person skilled in the art or those that are substantially the same.

In the following description, among a first direction, a second direction, and a third direction intersecting one another, the first direction is referred to as an "axial direction X", the second direction is referred to as a "width direction Y", and the third direction is referred to as a "depth direction Z". Here, the axial direction X, the width direction Y, and the depth direction Z are orthogonal to one another. The axial direction X typically corresponds to a direction in which the stud bolt is inserted through the main body of the fixing structure and corresponds to a direction in which the pair of end face walls face each other. The width direction Y typically corresponds to a direction in which the pair of side face walls face each other and corresponds to a direction in which the pair of locking pieces correspond to each other. Each direction used in the following description will be described as a direction in a state in which the parts are assembled to one another unless otherwise specified.

Embodiment

Figure 4:
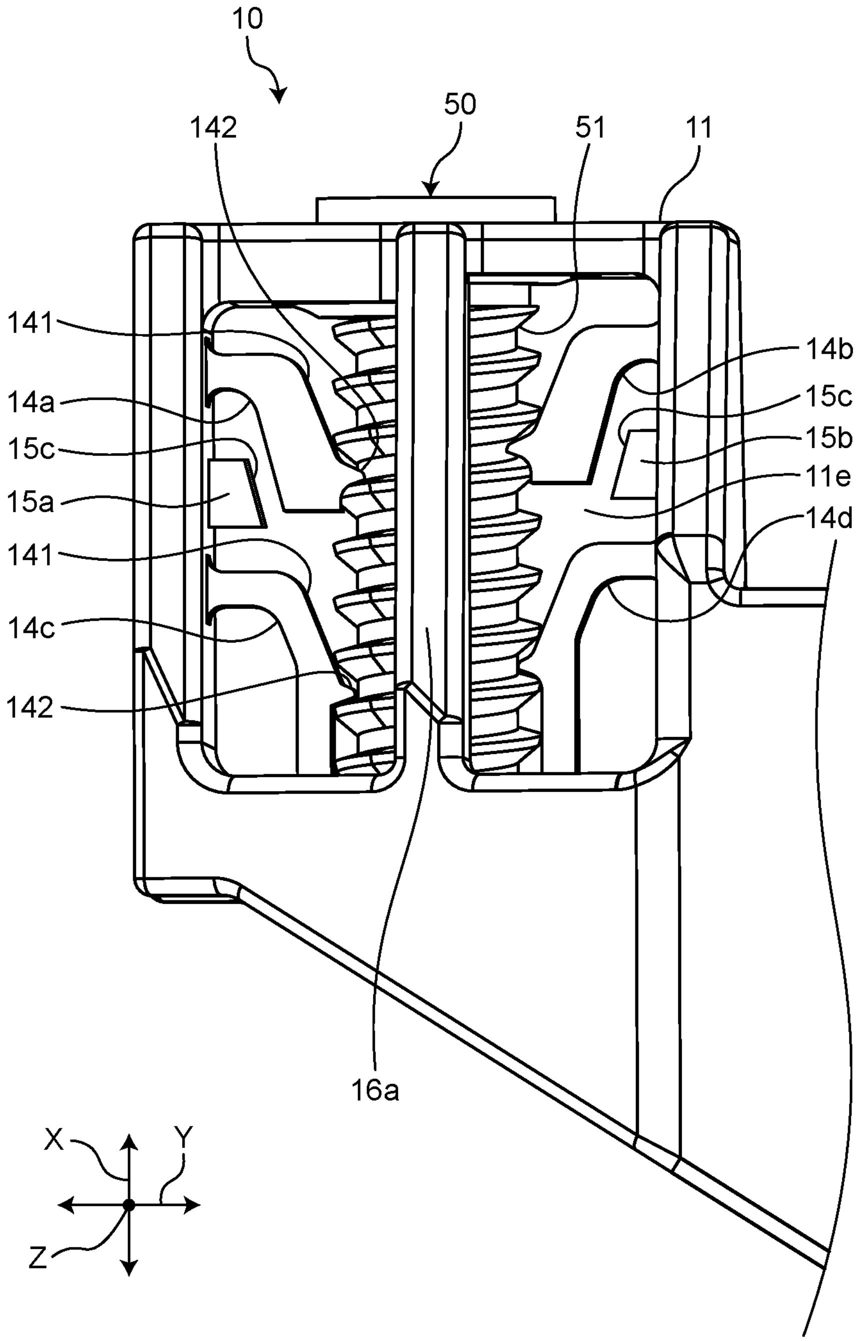
FIG. 4 is a side view illustrating a schematic configuration of the fixing structure (when the stud bolt is inserted) according to the embodiment.

One embodiment of a fixing structure according to the present invention will be described with reference to FIGS. 1 to 5. In FIGS. 2 and 4, illustration of the mounted member is omitted, and only the stud bolt is illustrated.

Figure 1:
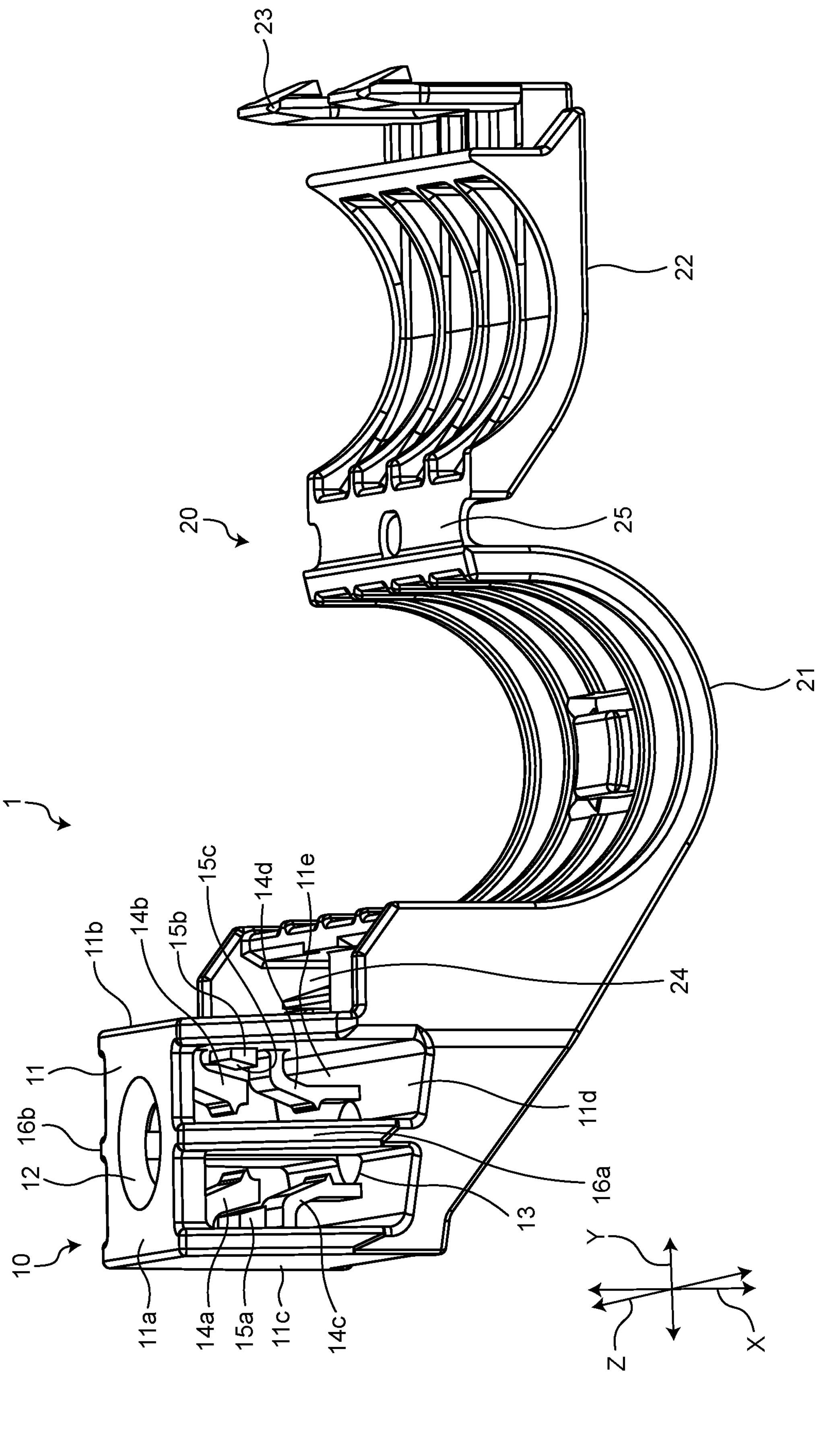
FIG. 1 is a perspective view illustrating a schematic configuration of a fixing structure according to an embodiment.
Figure 2:
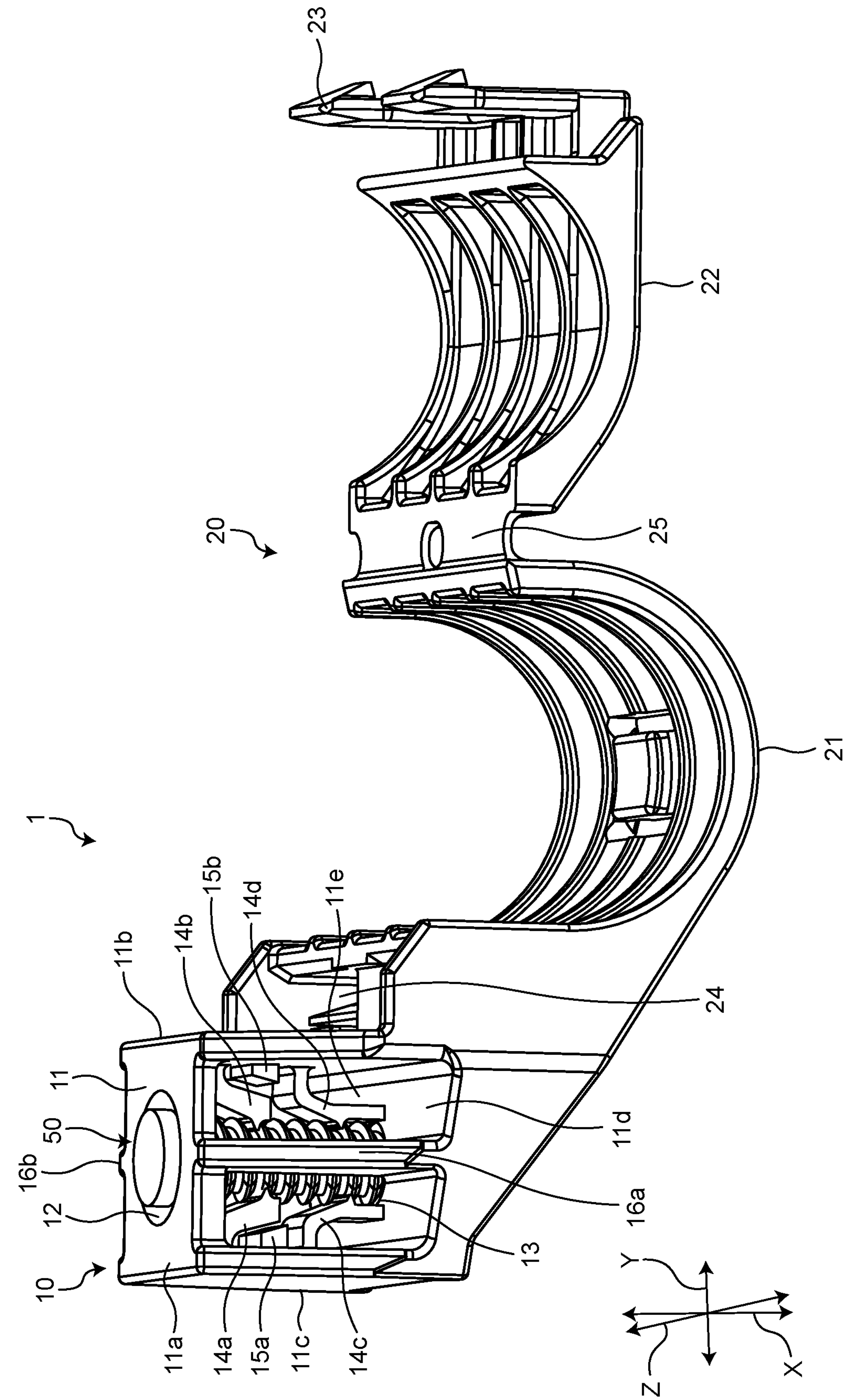
FIG. 2 is a perspective view illustrating a schematic configuration of the fixing structure (when a stud bolt is inserted) according to the embodiment.
Figure 3:
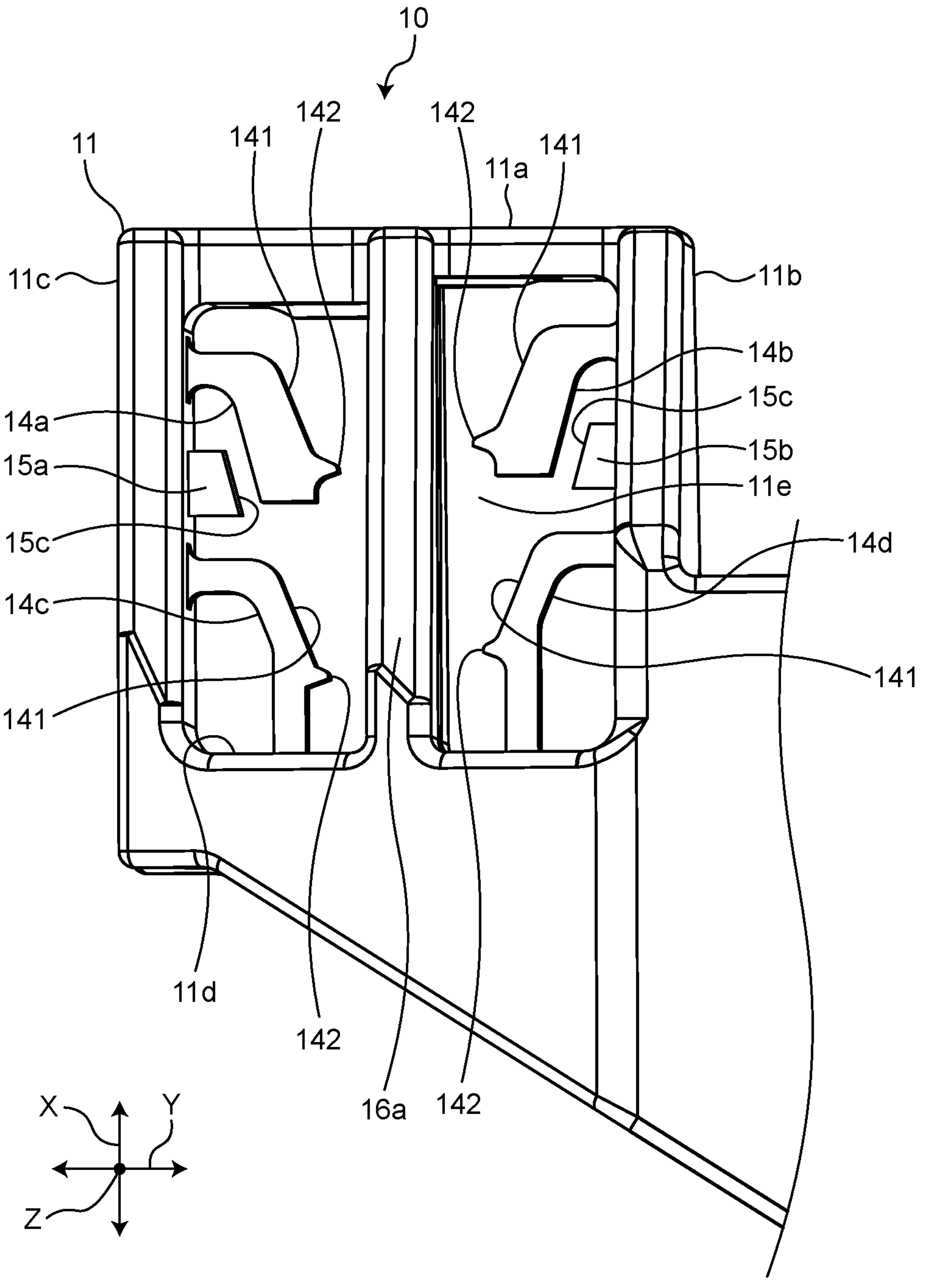
FIG. 3 is a side view illustrating a schematic configuration of the fixing structure according to the embodiment.

As illustrated in FIGS. 1 and 2, a fixing structure 10 according to the present embodiment is provided in a mounting member 1 and locks a stud bolt 50 fixed to a mounted member (not illustrated). The stud bolt 50 includes a bolt groove 51 having a spiral shape or an annular shape formed in a shaft. The mounting member 1 is used, for example, to fix a cable or the like to a mounted member such as a vehicle body panel. In the mounting member 1, a holding member 20 that holds the cable and the like and the fixing structure 10 are integrally formed using a resin material having an insulating property. The holding member 20 constitutes a protector that is externally mounted on a cable or the like, protects the cable or the like, and regulates a routing path of the cable or the like. The holding member 20 includes a first holder part 21 and a second holder part 22, both of which have a semi-cylindrical shape. The first holder part 21 and the second holder part 22 are continuously connected by a connection part 25. The second holder part 22 is bent at the connection part 25 to form a cylindrical holder together with the first holder part 21. By inserting and locking an engaging part 23 into an insertion opening 24, the holding member 20 is fixed in a state in which the first holder part 21 and the second holder part 22 form the holder. Note that the configuration of the holding member 20 is merely an example, and a holding member having another configuration may be adopted.

The fixing structure 10 includes: a main body 11 through which the stud bolt 50 fixed to the mounted member is inserted from one side to the other side in the axial direction X; a pair of upper locking pieces 14*a* and 14*b* that is provided to face each other at the main body 11 in the width direction Y intersecting the axial direction X and is locked to the bolt groove 51 of the stud bolt 50 inserted through the main body 11; a pair of lower locking pieces 14*c* and 14*d* that are located on the other side in the axial direction X with respect to the upper locking pieces 14*a* and 14*b*, respectively; and a pair of deflection amount regulators 15*a* and 15*b* that is provided to face each other at the main body 11 in the width direction Y and is contactable with the upper locking pieces 14*a* and 14*b*, respectively. In the fixing structure 10 of the present embodiment, the pair of upper locking pieces 14*a* and 14*b* corresponds to a pair of first locking pieces, and the pair of lower locking pieces 14*c* and 14*d* corresponds to a pair of second locking pieces. In the fixing structure 10, the stud bolt 50 is inserted from one side, that is, from a bolt insertion hole 12, and inserted toward the other side, that is, toward a bolt insertion hole 13, and the distal end of the stud bolt 50 passes through bolt insertion hole 13 to protrude therefrom.

The main body 11 includes: a pair of end face walls 11*a* and 11*d* located to face each other in the axial direction X and respectively formed with bolt insertion holes 12 and 13 through which the stud bolt 50 is inserted; a pair of side face walls 11*b* and 11*c* located to face each other in the width direction Y and each extending between the pair of end face walls 11*a* and 11*d* in the axial direction X; and a pair of supports 16*a* and 16*b* located to face each other in the depth direction Z and each extending between the pair of end face walls 11*a* and 11*d* in the axial direction X. A space formed by being surrounded by the pair of end face walls 11*a* and 11*d* and the pair of side face walls 11*b* and 11*c* constitutes a bolt receiving space 11*e* that receives the stud bolt 50 inserted through the bolt insertion hole 12.

A bolt insertion hole 12 through which the stud bolt 50 is inserted is formed at the end face wall 11*a*, and the bolt insertion hole 13 is formed at the end face wall 11*d*. The end face wall 11*d* and the end face wall 11*a* are disposed to face each other in the axial direction X, that is, the stud bolt 50 insertion direction.

The side face wall 11*b* is provided to extend between the end face walls 11*a* and 11*d*. On a wall face of the side face wall 11*b* on the bolt receiving space 11*e* side, the upper locking piece 14*b*, the deflection amount regulator 15*b*, and the lower locking piece 14*d* are disposed in this order from the end face wall 11*a* side to the end face wall 11*d* side.

The side face wall 11*c* is provided to extend between the end face walls 11*a* and 11*d*. On a wall face of the side face wall 11*c* on the bolt receiving space 11*e* side, the upper locking piece 14*a*, the deflection amount regulator 15*a*, and the lower locking piece 14*c* are disposed in this order from the end face wall 11*a* side to the end face wall 11*d* side.

The supports 16*a* and 16*b* are each provided to extend between the end face walls 11*a* and 11*d*. The supports 16*a* and 16*b* are formed such that the width from one side (the bolt insertion hole 12 side) to the other side (the bolt insertion hole 13 side) in the axial direction X gradually increases. The supports 16*a* and 16*b* connect the bolt insertion hole 12 and the bolt insertion hole 13. As a result, the fixing structure 10 prevents oblique entry of the stud bolt 50 in the directions toward the supports 16*a* and 16*b*.

The upper locking pieces 14*a* and 14*b* are formed to protrude from the side face walls 11*c* and 11*b*, respectively, toward the bolt receiving space 11*e* side and each extend toward the other side in the axial direction X. The upper locking pieces 14*a* and 14*b* each include an elastically deformable blade 141 and a claw 142 formed to protrude from the blade 141 and locked to the bolt groove 51. The upper locking pieces 14*a* and 14*b* are each formed to have a width in the depth direction Z slightly larger than the diameter of the stud bolt 50. For example, the width is about 5 mm.

Figure 5:
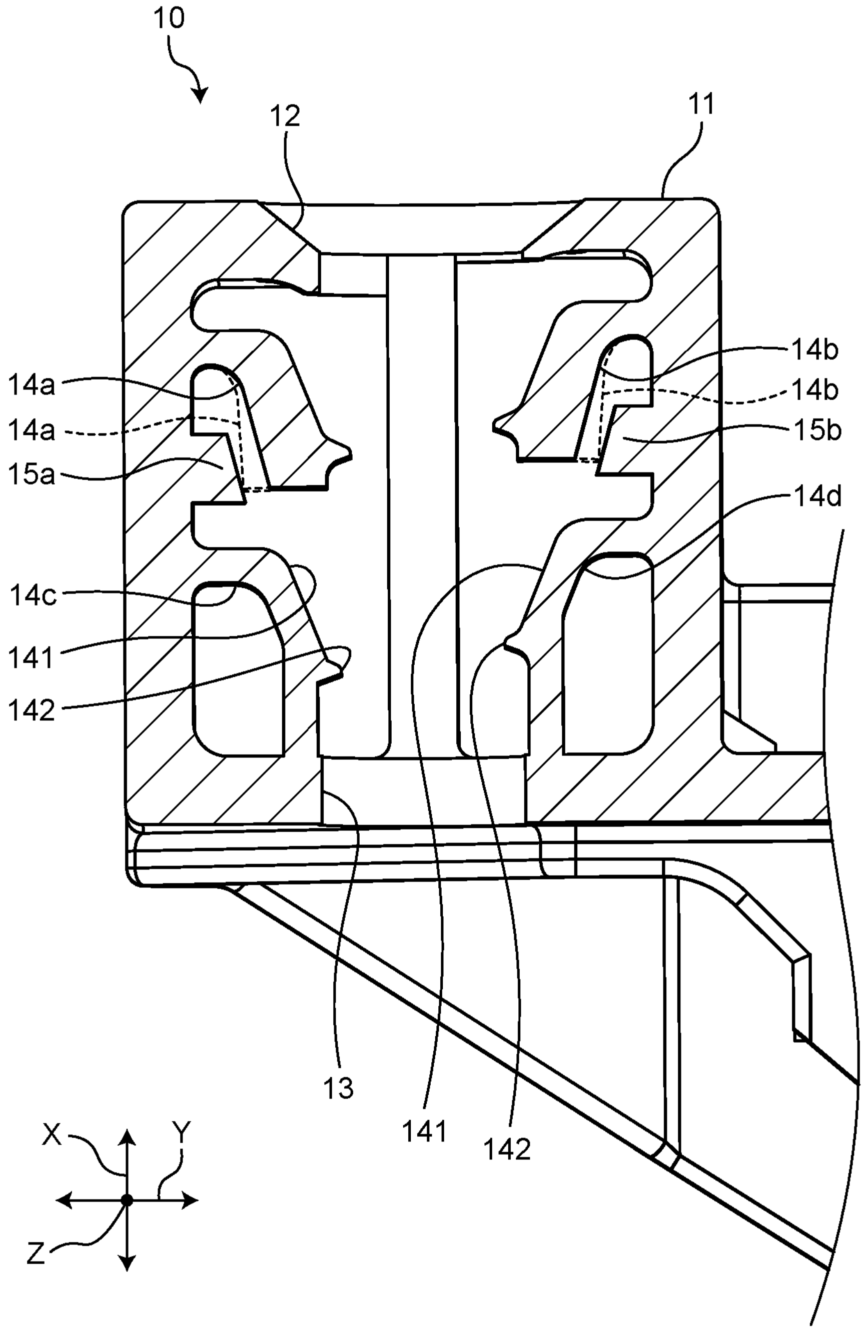
FIG. 5 is a sectional view of the fixing structure according to the embodiment.

The deflection amount regulators 15*a* and 15*b* are provided at positions where distal ends of the blades 141 on the other side in the axial direction X come into contact with the side face walls 11*c* and 11*b*, respectively, when the blades 141 of the upper locking pieces 14*a* and 14*b* are respectively deflected toward the side face walls 11*c* and 11*b* with the insertion of the stud bolt 50 into the bolt insertion hole 12 (see dotted lines in FIG. 5).

The upper locking pieces 14*a* and 14*b* are deflected upon the insertion of the stud bolt 50 to reduce force (insertion force) required to insert the stud bolt 50. The reduced thickness of the upper locking pieces 14*a* and 14*b* can reduce the insertion force of the stud bolt 50. However, when the stud bolt 50 is inserted while deviating from the axial direction X, the insertion direction of the stud bolt 50 may not be able to be returned to the axial direction X by the elastic force of the upper locking pieces 14*a* and 14*b*. Thus, the distal end of the stud bolt 50 may not be able to pass through the bolt insertion hole 13. On the other hand, in the present embodiment, the deflection amount regulators 15*a* and 15*b* are provided at positions where the distal ends of the blades 141 of the upper locking pieces 14*a* and 14*b* would respectively come into contact with. With this configuration, the deflection amounts of the upper locking pieces 14*a* and 14*b* can be regulated (see dotted lines in FIG. 5). In this way, even when the stud bolt 50 is inserted while deviating from the axial direction X, the insertion direction of the stud bolt 50 can be regulated to the direction in which the distal end of the stud bolt 50 can pass through the bolt insertion hole 13 while reducing the insertion force of the stud bolt 50 by reducing the elastic force of the upper locking pieces 14*a* and 14*b*. As a result, upon mounting the mounting member 1 on the mounted member including the stud bolt 50, the fixing structure 10 can appropriately mount the mounting member 1 on the mounted member by preventing oblique entry of the stud bolt 50.

Contact faces 15*c* of the deflection amount regulators 15*a* and 15*b* with the respective upper locking pieces 14*a* and 14*b* are formed so as to be substantially parallel to the extending direction of the blades 141 of the respective upper locking pieces 14*a* and 14*b*. Each of the deflection amount regulators 15*a* and 15*b* can increase the contact area between the blade 141 and the contact face 15*c* upon the deflection of the blade 141 due to the insertion of the stud bolt 50 by making the contact face 15*c* substantially parallel to the extending direction of the blade 141. With this configuration, each of the deflection amount regulators 15*a* and 15*b* can reduce the stress applied per unit contact area of the blade 141 and can prevent the blade 141 from being broken.

The lower locking pieces 14*c* and 14*d* are formed to protrude from the side face walls 11*c* and 11*b*, respectively, toward the bolt receiving space 11*e* side and each extend toward the other side in the axial direction X. The lower locking pieces 14*c* and 14*d* each include an elastically deformable blade 141 and the claw 142 formed to protrude from the blade 141 and locked to the bolt groove 51. The blades 141 of the lower locking pieces 14*c* and 14*d* are fixed such that the ends of the blades 141 on the other side in the axial direction X are adjacent to the bolt insertion hole 13 of the end face wall 11*d* located on the other side in the axial direction X. The lower locking pieces 14*c* and 14*d* are each formed to have a width in the depth direction Z slightly larger than the diameter of the stud bolt 50, similarly to the upper locking pieces 14*a* and 14*b*. For example, the width is about 5 mm.

The lower locking pieces 14*c* and 14*d* reduce the insertion force of the stud bolt 50 due to deflection upon the insertion of the stud bolt 50, similarly to the upper locking pieces 14*a* and 14*b*. The thicknesses of the lower locking pieces 14*c* and 14*d* are adjusted in order to adjust the insertion force of the stud bolt 50. In order to prevent oblique entry of the stud bolt 50, the blades 141 of the lower locking pieces 14*c* and 14*d* are fixed such that the ends of the blades 141 on the other side in the axial direction X are adjacent to the bolt insertion hole 13 of the end face wall 11*d* located on the other side in the axial direction X. The lower locking pieces 14*c* and 14*d* can guide the insertion of the distal end of the stud bolt 50 into the bolt insertion hole 13 while reducing the insertion force of the stud bolt 50 by fixing the ends of the blades 141 of the lower locking pieces 14*c* and 14*d* adjacently to the bolt insertion hole 13. Note that, from the viewpoint of the insertability of the stud bolt 50 into the bolt insertion hole 13, the blades 141 of the lower locking pieces 14*c* and 14*d* are preferably fixed to the bolt insertion hole 13 without a step (to be flush).

Note that, in the present embodiment, the stud bolt 50 is locked by the upper locking pieces 14*a* and 14*b* and the lower locking pieces 14*c* and 14*d*, but it is not necessary to provide the lower locking pieces 14*c* and 14*d* in the fixing structure 10 in applications in which high fixing strength of the mounting member 1 to the mounted member is not required. The fixing structure 10 may be provided with additional locking pieces. For example, a pair of third locking pieces may be provided between the upper locking pieces 14*a* and 14*b* and the lower locking pieces 14*c* and 14*d*.

In the present embodiment, the ends of the blades 141 of the lower locking pieces 14*c* and 14*d* are fixed adjacently to the bolt insertion hole 13, but are not necessarily fixed. By regulating the deflection amounts of the upper locking pieces 14*a* and 14*b* located on one side in the axial direction X by the respective deflection amount regulators 15*a* and 15*b*, the insertion direction of the stud bolt 50 can be effectively regulated in a direction in which the stud bolt 50 can pass through the bolt insertion hole 13 even upon oblique entry of the stud bolt 50.

The insertion direction of the stud bolt 50 can be effectively regulated even with a configuration in which the ends of the blades 141 of the lower locking pieces 14*c* and 14*d* are not fixed adjacently to the bolt insertion hole 13 and a pair of deflection amount regulators contactable with the blades 141 of the lower locking pieces 14*c* and 14*d* are provided. When two or more pairs of locking pieces are provided and only one pair of deflection amount regulators are provided, the deflection amount regulators are preferably provided at positions where the deflection amount regulators are contactable with the respective locking pieces closest to one side in the axial direction.

The fixing structure according to the present embodiment has an effect that, upon mounting the mounting member on the mounted member including the stud bolt, a mounting member can be appropriately mounted on a mounted member by preventing oblique entry of the stud bolt.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fixing structure comprising:

a main body that is provided in a mounting member and through which a stud bolt fixed to a mounted member is inserted from one side to the other side in an axial direction;

a pair of first locking pieces facing each other at the main body in a width direction intersecting the axial direction, the pair of first locking pieces being locked to a bolt groove of the stud bolt inserted through the main body;

a pair of second locking pieces facing each other at the main body in the width direction, the pair of second locking pieces being located on the other side in the axial direction with respect to the pair of first locking pieces, and the pair of second locking pieces being locked to the bolt groove of the stud bolt inserted through the main body; and a pair of deflection amount regulators facing each other at the main body in the width direction, the pair of deflection amount regulators being contactable with the pair of first locking pieces, respectively, wherein the main body includes:

a pair of end face walls facing each other in the axial direction, each of the pair of end face walls including a bolt insertion hole through which the stud bolt is to be inserted;

a pair of side face walls facing each other in the width direction, each of the pair of side face walls extending between the pair of end face walls in the axial direction; and a bolt receiving space surrounded by the pair of end face walls and the pair of side face walls, the bolt receiving space being configured to receive the stud bolt inserted through the bolt insertion holes, each of the pair of first locking pieces includes:

a blade protruding from a corresponding one of the pair of side face walls toward the bolt receiving space and extending toward the other side in the axial direction, the blade being elastically deformable; and a claw protruding from the blade, the claw being locked to the bolt groove, each of the pair of second locking pieces includes:

a blade protruding from a corresponding one of the pair of side face walls toward the bolt receiving space and extending toward the other side in the axial direction, the blade being elastically deformable; and a claw protruding from the blade, the claw being locked to the bolt groove, the blade of each of the pair of second locking pieces is fixed such that an end of the blade on the other side in the axial direction is adjacent to the bolt insertion hole of an end face wall located on the other side in the axial direction among the pair of end face walls, and each of the pair of deflection amount regulators protrudes from a corresponding one of the pair of side face walls toward the bolt receiving space, and each of the pair of deflection amount regulators comes into contact with a respective one of the blades of the first locking pieces to regulate a deflection amount of the blade.

2. The fixing structure according to claim 1, wherein each of the pair of deflection amount regulators is provided at a position where a distal end of the respective one of the blades of the first locking pieces on the other side in the axial direction comes into contact with a corresponding one of the pair of side face walls, when the respective one of the blades of the first locking pieces is deflected with insertion of the stud bolt.

* * * * *